United States Patent Office 3,245,753
Patented Apr. 12, 1966

3,245,753
PYROSULFURYL CHLOROFLUORIDE PROCESS
Santad Kongpricha, Hamden, and William C. Preusse, Orange, Conn., assignors to Olin Mathieson Chemical Corporation, New Haven, Conn., a corporation of Virginia
No Drawing. Filed Feb. 26, 1963, Ser. No. 261,192
3 Claims. (Cl. 23—14)

This invention relates to an improved process for preparing pyrosulfuryl chlorofluoride ($S_2O_5ClF$).

Pyrosulfuryl chloride ($S_2O_5Cl_2$) can undergo replacement reactions with various fluorinating agents to obtain pyrosulfuryl fluoride ($S_2O_5F_2$) and the aforementioned chlorofluoride. For instance, when $S_2O_5Cl_2$ is reacted with antimony trifluorochloride, both chlorine atoms are replaced with fluorine atoms. When $S_2O_5Cl_2$ is reacted with benzoyl fluoride, it has been found that a mixture of $S_2O_5ClF$ and $S_2O_5F_2$ is obtained. Neither fluorinating agent can be utilized to obtain the chlorofluoride as the sole reaction product since the predominant product is $S_2O_5F_2$.

It has been reported by Engelbrecht in Z. anorg. allgem. Chem., 273, 267 (1953), that pyrosulfuryl chloride was reacted with AgF and $AgF_2$ to obtain $S_2O_5ClF$ as the sole product with no formation of $S_2O_5F_2$. However, a yield of only about 30% was obtained, and since the silver salts are costly, their use in any commercially practical process would be prohibitively expensive. Furthermore, these silver salts are difficult to handle since they are very susceptible to hydrolysis. In addition, the process disclosed in Engelbrecht, supra, is not suitable for adaptation to a continuous process since the formed $S_2O_5ClF$ decomposes upon heating with excess amounts of silver fluorides.

$S_2O_5ClF$, because of the chlorine atom therein, is a more reactive intermediate than the analogous $S_2O_5F_2$. It is useful as an intermediate in the preparation of various halosulfonates and sulfur oxyhalides. It is particularly useful in replacement reactions wherein derivatives of pyrosulfuryl mono-fluoride are obtained. However, as noted in the preceding discussion, the preparation of the chlorofluoride in good yield has not heretofore been possible.

Therefore, the primary object of this invention was to provide an improved process for the preparation of $S_2O_5ClF$. Another object was to provide a process for preparing $S_2O_5ClF$ in good yield by the reaction of $S_2O_5Cl_2$ with a fluorinating agent. Still another object of this invention was to provide an efficient process for the preparation of $S_2O_5ClF$ wherein an inexpensive and readily available fluorinating agent could be utilized. Other objects will be apparent from the following discussion.

These objects have been accomplished in accordance with the present invention. It has been found that $S_2O_5Cl_2$ can be reacted with fluorosulfonic acid, a strong fluorinating agent, to obtain pyrosulfuryl chlorofluoride in good yield. The $S_2O_5ClF$ obtained as a result of this process is of high purity and is not contaminated with $S_2O_5F_2$. No $S_2O_5F_2$ is obtained even in the presence of a large excess of fluorosulfonic acid. This was an unexpected result since $FSO_3H$ is considered a strong fluorinating agent, and it could be reasonably assumed that both chlorine atoms in $S_2O_5Cl_2$ would react similarly with fluorosulfonic acid. Therefore, a direct process is herein provided for the preparation of $S_2O_5ClF$ wherein an inexpensive and readily available fluorinating agent is used. The process is also suitable for use in continuous operations since $S_2O_5ClF$ is apparently stable in the presence of excess fluorosulfonic acid. The novel process of this invention is also characterized by the use of reactants which do not present any particular handling problems.

Briefly, the process described herein for the preparation of $S_2O_5ClF$ comprises mixing $S_2O_5Cl_2$ with fluorosulfonic acid and heating the resulting solution at a reaction temperature in the range of 100° C. to 160° C. The preferred process embodiment utilizes a reaction temperature range of about 120° to about 140° C. Since $S_2O_5ClF$ boils at about 100° C. at atmospheric pressure, it is usually desirable to use a reflux condenser in the reaction system until reaction is complete and the pyrosulfuryl chlorofluoride can be distilled from the reaction mixture. However, the product can be removed from the reaction mixture as it is formed by using a distillation head and maintaining a proper reflux ratio, thus separating the product from the higher boiling reactants. It has been found that pyrosulfuryl chlorofluoride can be obtained by the process described herein in yields of up to 60% if distillation techniques are employed wherein all of the desired product is separated from higher boiling materials such as $FSO_3H$ and $S_2O_5Cl_2$.

Although a molar excess of fluorosulfonic acid may be used in the process, there are no significant advantages to be derived from such use, and therefore in the preferred process embodiment equimolar amounts of $S_2O_5Cl_2$ and $FSO_3H$ are employed. However, it has been found that the product $S_2O_5ClF$ is stable in the presence of excess fluorosulfonic acid (see Example 3 herein), and therefore this process can be used in the continuous production of pyrosulfuryl chlorofluoride if desired.

The following examples are offered as illustrative of the method of this invention. However, it is to be understood that these examples are not to be construed as limiting the scope of this invention.

*Example 1*

A 250 ml. round-bottom flask was equipped with a water-cooled reflux condenser connected to a drying tube containing anhydrous calcium sulfate. Into the reaction flask was placed 21.2 g. (0.212 mole) of fluorosulfonic acid and 45.3 g. (0.212 mole) of pyrosulfuryl chloride. The solution was heated to boiling under reflux conditions for two hours. During this period, the flask temperature was about 120° to 130° C.

After this refluxing period, the reaction mixture was distilled at atmospheric pressure and a liquid product boiling between 85° to 110° C. was obtained. This liquid was redistilled and 22.8 g. of a colorless liquid having a boiling point of 99° to 101° C. was collected. This boiling point corresponds to the value reported for pyrosulfuryl chlorofluoride by Engelbrecht, supra. The following analytical data also revealed that the desired product had been obtained. Yield: 55%.

*Analysis.*—Calcd. for $S_2O_5ClF$: Cl, 17.85. Found: Cl, 17.82.

Infrared analysis showed the characteristic S-O absorption at 1250 and at 1500 cm.$^{-1}$ and at 1210 and 1450 cm.$^{-1}$ with respect to the $SO_2Cl$ group. The S-F absorption was also found at 800, 810 and at 860 cm.$^{-1}$.

*Example 2*

A 500 ml. round-bottom flask was equipped with an air cooled condenser connected at the top to a distillation head. Into the flask was placed 40.0 g. (0.40 mole) of fluorosulfonic acid and 43.0 g. (0.20 mole) of pyrosulfuryl chloride. The solution was heated under total reflux for 1¾ hours at a reaction temperature of about 130° to 135° C. Then a liquid product boiling at 96° to 110° C. was collected upon distillation at atmospheric pressure. This material was fractionally redistilled, and there was obtained an approximately 50% yield of colorless pyrosulfuryl chlorofluoride boiling at 99° to 101° C.

*Example 3*

A 250 ml. round-bottom flask was equipped with a short air cooled packed column and a distillation head containing a water condenser. Into the flask was placed 49.5 g. (0.249 mole) of $S_2O_5ClF$ and 57.4 g. (0.574 mole) of fluorosulfonic acid. The solution was heated to boiling under reflux conditions for a period of nine hours. The solution was fractionally distilled at atmospheric pressure and no $S_2O_5F_2$ (B.P. 52° C.) was obtained. Instead, the pyrosulfuryl chlorofluoride was recovered essentially unchanged.

What is claimed is:

1. A process for providing pyrosulfuryl chlorofluoride which is essentially uncontaminated with pyrosulfuryl fluoride which comprises reacting pyrosulfuryl chloride with fluorosulfonic acid at a temperature in the range of 100° to 160° C.

2. The process of claim 1 wherein a reaction temperature range of about 120° to 140° C. is utilized.

3. A process for providing pyrosulfuryl chlorofluoride which is essentially uncontaminated with pyrosulfuryl fluoride which comprises reacting pyrosulfuryl chloride with a substantially equimolar amount of fluorosulfonic acid at a reaction temperature of about 100° to about 160° C. and distilling the pyrosulfuryl chlorofluoride product from the reaction mixture.

References Cited by the Examiner

UNITED STATES PATENTS

| | | | |
|---|---|---|---|
| 2,562,432 | 7/1951 | McCann et al. | 23—14 X |
| 2,832,667 | 4/1958 | Muetterties | 23—88 X |

BENJAMIN HENKIN, *Primary Examiner.*

MAURICE A. BRINDISI, *Examiner.*

R. M. DAVIDSON, *Assistant Examiner.*